(12) United States Patent
Galamba et al.

(10) Patent No.: US 11,851,010 B2
(45) Date of Patent: Dec. 26, 2023

(54) PROTECTIVE, LOCATABLE SLEEVE AND METHOD OF CONSTRUCTION THEREOF

(71) Applicant: FEDERAL-MOGUL POWERTRAIN LLC, Southfield, MI (US)

(72) Inventors: Steve Galamba, West Chester, PA (US); James Golinsky, Pennsburg, PA (US); Dan Rowcotsky, Dresher, PA (US); Marc Schumaker, Madison Heights, MI (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 17/544,577

(22) Filed: Dec. 7, 2021

(65) Prior Publication Data

US 2022/0176899 A1 Jun. 9, 2022

Related U.S. Application Data

(60) Provisional application No. 63/122,797, filed on Dec. 8, 2020.

(51) Int. Cl.
*B60R 16/02* (2006.01)
*H02G 3/04* (2006.01)

(52) U.S. Cl.
CPC ....... *B60R 16/0215* (2013.01); *H02G 3/0468* (2013.01); *H02G 3/0481* (2013.01)

(58) Field of Classification Search
CPC .............. B60R 16/0215; H02G 3/0468; H02G 3/0481; H02G 3/0616; H02G 3/0691; H02G 15/043; H02G 15/046
See application file for complete search history.

(56) References Cited

U.S. PATENT DOCUMENTS

| | | | |
|---|---|---|---|
| 5,256,233 A | 10/1993 | Winter | |
| 5,829,485 A | 11/1998 | Fatato | |
| 5,990,419 A * | 11/1999 | Bogese, II | ............. H01B 7/184 174/120 SR |

(Continued)

FOREIGN PATENT DOCUMENTS

EP 0877892 B1 11/1999

OTHER PUBLICATIONS

International Search Report, dated Mar. 18, 2022 (PCT/US2021/062330).

*Primary Examiner* — Paresh Paghadal
(74) *Attorney, Agent, or Firm* — Robert L. Stearns; Dickinson Wright PLLC

(57) ABSTRACT

A protective sleeve assembly for protecting an electrical member and a wire harness extending therethrough and method of construction thereof are provided. The sleeve assembly includes a multi-layer tube extending longitudinally along an axis between opposite ends. An end cap is disposed over one of the opposite ends. The end cap has an opening through which the wire harness extends to allow assembly and disassembly of the protective sleeve assembly along the wire harness and about the electrical member. The multilayer tube includes an inner tube and an outer tube. The inner tube has a semi-rigid tubular wall including radially extending energy dissipating features to minimize the transmission of impact forces to the electrical member. The outer tube is a textile tube disposed about the inner tube.

15 Claims, 4 Drawing Sheets

(56) References Cited

U.S. PATENT DOCUMENTS

| | | | |
|---|---|---|---|
| 6,000,434 A * | 12/1999 | Winter | F16L 11/115 |
| | | | 156/143 |
| 6,051,291 A | 4/2000 | Gladfelter | |
| 7,469,563 B2 | 12/2008 | Wahlgren et al. | |
| 7,874,184 B2 | 1/2011 | Malloy et al. | |
| 8,663,766 B2 | 3/2014 | Sellis et al. | |
| 2003/0168248 A1 | 9/2003 | Savoy | |
| 2006/0054763 A1 | 3/2006 | Fryberger | |
| 2007/0191755 A1* | 8/2007 | Sellis | G01D 11/245 |
| | | | 604/15 |
| 2012/0152429 A1* | 6/2012 | Spruell | H01B 13/141 |
| | | | 156/52 |
| 2017/0288337 A1* | 10/2017 | Martino | H01R 13/59 |
| 2018/0169992 A1 | 6/2018 | Rebentrost et al. | |
| 2020/0023720 A1* | 1/2020 | Schuett | B60J 5/0418 |

\* cited by examiner

PROTECTIVE, LOCATABLE SLEEVE AND METHOD OF CONSTRUCTION THEREOF

CROSS-REFERENCE TO RELATED APPLICATION

This application claims the benefit of U.S. Provisional Application Ser. No. 63/122,797, filed Dec. 8, 2020, which is incorporated herein by reference in its entirety.

BACKGROUND OF THE INVENTION

1. Technical Field

This invention relates to protective sleeves having an integral location feature that allows the sleeves to be locatable and releasably fixable along an elongated item to be protected against impact forces, abrasion and cut-through and to methods of construction therefor.

2. Related Art

Sensors used in automotive applications, such as oxygen sensors which provide data to control engine operation and performance, are often mounted within the engine compartment of a vehicle where they are subject to a harsh environment including intense radiant heat, sources of impact, abrasion and constant vibration during vehicle operation. In view of the harsh environment, it is advantageous to cover the relatively delicate sensors and electrical members, such as wire harnesses, connected thereto with protective sleeving that can damp vibration, protect against impact forces, abrasion and reflect and shield radiant heat. Such sleeves often comprise an elongated flexible, relatively soft textile tube having an inner damping layer of a non-woven material, for example, polyester felt. The inner damping layer is typically surrounded by a reflective layer of aluminum foil layer laminated with a reinforcing layer, such as a woven scrim of polymer filaments or a polymer sheet material.

Due to the nature of the protective sleeve and its environment, it is difficult to attach the sleeve to the sensor in a manner which will allow the sleeve to be reliably secured in a desired position and also be readily removable for installation and servicing of the sensor. Adhesives, tape and frictional fits are used to effect attachment, but these methods all suffer various disadvantages. Adhesive attachment to the sensor, while generally secure, permanently attaches the sleeve. As a result, this method does not allow for easy removal of the sleeve for servicing of the sensor or reuse of the sleeve. In addition, tape and friction fits can be unreliable and not feasible in view of the heat and vibration encountered by the sensor and its protective sleeve within the engine compartment. Further yet, due to the nature of the tube being relatively soft, protection against impact forces and resistance to cut-through is generally low.

SUMMARY OF THE INVENTION

The invention provides a protective sleeve assembly for protecting an electrical member extending therethrough against exposure to contamination, impact forces, abrasion, and vibration. The protective sleeve assembly includes a semi-rigid, multi-layer tube extending longitudinally along an axis between opposite ends and an end cap disposed over one of the ends. The end cap includes at least one finger that extends radially inward generally toward the axis. The at least one finger is resiliently flexible in opposite axial directions to allow assembly and disassembly of the protective sleeve assembly about the electrical member being protected. The semi-rigid, multilayer tube includes an inner tube and an outer tube. The inner tube has a semi-rigid tubular wall including energy dissipating features that act to minimize the transmission of impact forces to the electrical member, while also enhancing cut-through resistance and protection against contamination ingress. The outer tube is a textile tube disposed about the inner tube to provide cut-through resistance and resistance to abrasion to the protective sleeve assembly.

In accordance with another aspect of the invention, the end cap can be provided as a separate member that is fastened to at least one of the inner tube and/or outer tube.

In accordance with another aspect of the invention, the end cap can be fastened to the tube by a fastener, such as staples, threaded fasteners, or rivets.

In accordance with another aspect of the invention, the fastener can be in the form of an adhesive.

In accordance with another aspect of the invention, the fastener can be in the form a weld joint.

In accordance with another aspect of the invention, the weld joint can be in the form of an ultrasonic weld joint.

In accordance with another aspect of the invention, the inner tube be formed of a solid, impervious, tubular polymeric wall.

In accordance with another aspect of the invention, the inner tube can have ribs to enhance energy dissipation.

In accordance with another aspect of the invention, the ribs of the inner tube can form open pockets, also referred to as voids, between the inner tube and the outer tube to enhance energy dissipation, impact resistance, vibration reduction, and protection against the ingress of contamination into a central cavity bounded by the protective sleeve assembly.

In accordance with another aspect of the invention, the end cap can be fabricated of a solid, semi-rigid, nonmetallic material.

In accordance with another aspect of the invention, the fingers can be generally triangular.

In accordance with another aspect of the invention, the outer tube can be knit, woven or braided of any number of monofilaments and/or multifilaments.

In accordance with another aspect of the invention, the monofilaments and/or multifilaments can include wire to enhance cut-through resistance.

In accordance with another aspect of the invention, a method of constructing a protective sleeve assembly for protecting an electrical member extending therethrough against exposure to contamination, impact forces, abrasion, and vibration is provided. The method includes forming a semi-rigid, multi-layer tube extending longitudinally along an axis between opposite ends and providing an end cap having at least one finger that extends radially inward generally toward the axis disposed over one of the ends, with the at least one finger being resiliently flexible in opposite axial directions to allow assembly and disassembly of the protective sleeve assembly about the electrical member being protected. The method further includes constructing the semi-rigid, multilayer tube including an inner tube and an outer tube, and constructing the inner tube having a semi-rigid tubular wall including energy dissipating features that acts to dissipate energy to minimize the transmission of impact forces to the electrical member, while also enhancing cut-through resistance and protection against contamination ingress. The method further includes constructing the outer tube as a textile tube disposed about the inner tube to provide cut-through resistance and resistance to abrasion to the protective sleeve assembly.

In accordance with another aspect of the invention, the method further includes constructing the inner tube as a solid, tubular polymeric, impervious wall.

In accordance with another aspect of the invention, the method further includes constructing the inner tube can having ribs to enhance energy dissipation.

In accordance with another aspect of the invention, the method further includes constructing the ribs of the inner tube to extending radially outwardly from the impervious wall to form open, peripherally bounded pockets facing radially outwardly, also referred to as voids, thereby forming encapsulated chambers between the inner tube and the outer tube to enhance energy dissipation, impact resistance, vibration reduction, and protection against the ingress of contamination into a central cavity bounded by the protective sleeve assembly.

In accordance with another aspect of the invention, the method further includes leaving the encapsulated chambers void of solid matter, thereby providing the encapsulated chambers filled with only air to act as individual cushion against impact forces and to enhance thermal protection to the electrical member extending through the cavity of the protective sleeve assembly, while reducing weight of the protective sleeve assembly.

In accordance with another aspect of the invention, the method further includes filling the open pockets with a solid material, including any suitable open or closed cell foam, elastomer, rubber, gel, or non-woven material.

In accordance with another aspect of the invention, the method further includes constructing the ribs of the inner tube to extending radially inwardly from the impervious wall.

In accordance with another aspect of the invention, the method further includes constructing the radially inwardly extending ribs to extend lengthwise between opposite ends of the inner tube.

In accordance with another aspect of the invention, the method further includes knitting, weaving or braiding the outer tube of any number and material type of monofilaments and/or multifilaments.

BRIEF DESCRIPTION OF THE DRAWINGS

These and other features and advantages of the present invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
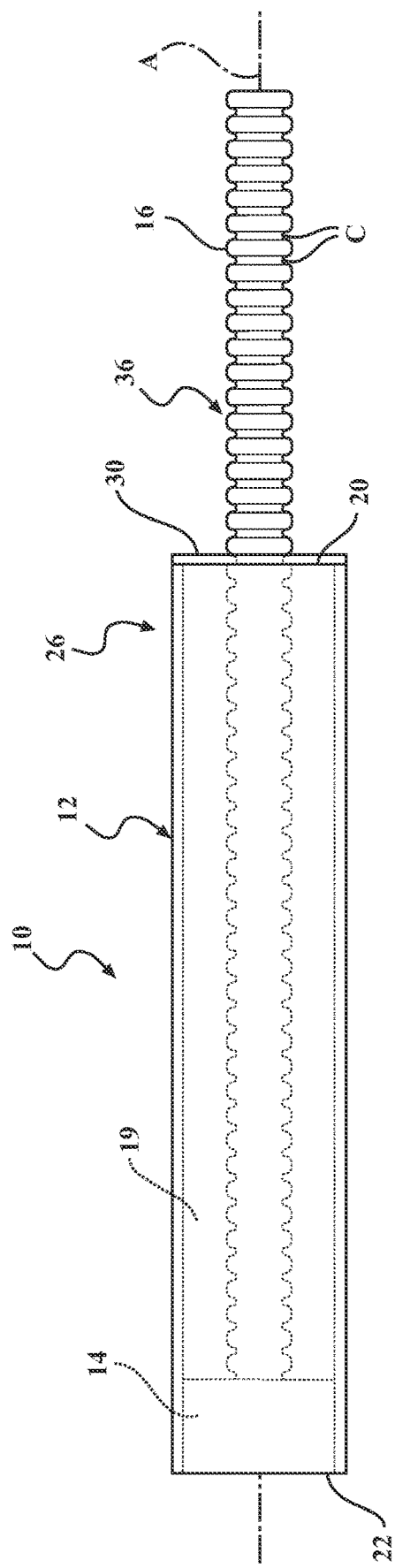
FIG. 1 is schematic side view of a protective sleeve assembly for protecting an electrical member according to one presently preferred embodiment of the invention.
Figure 2:
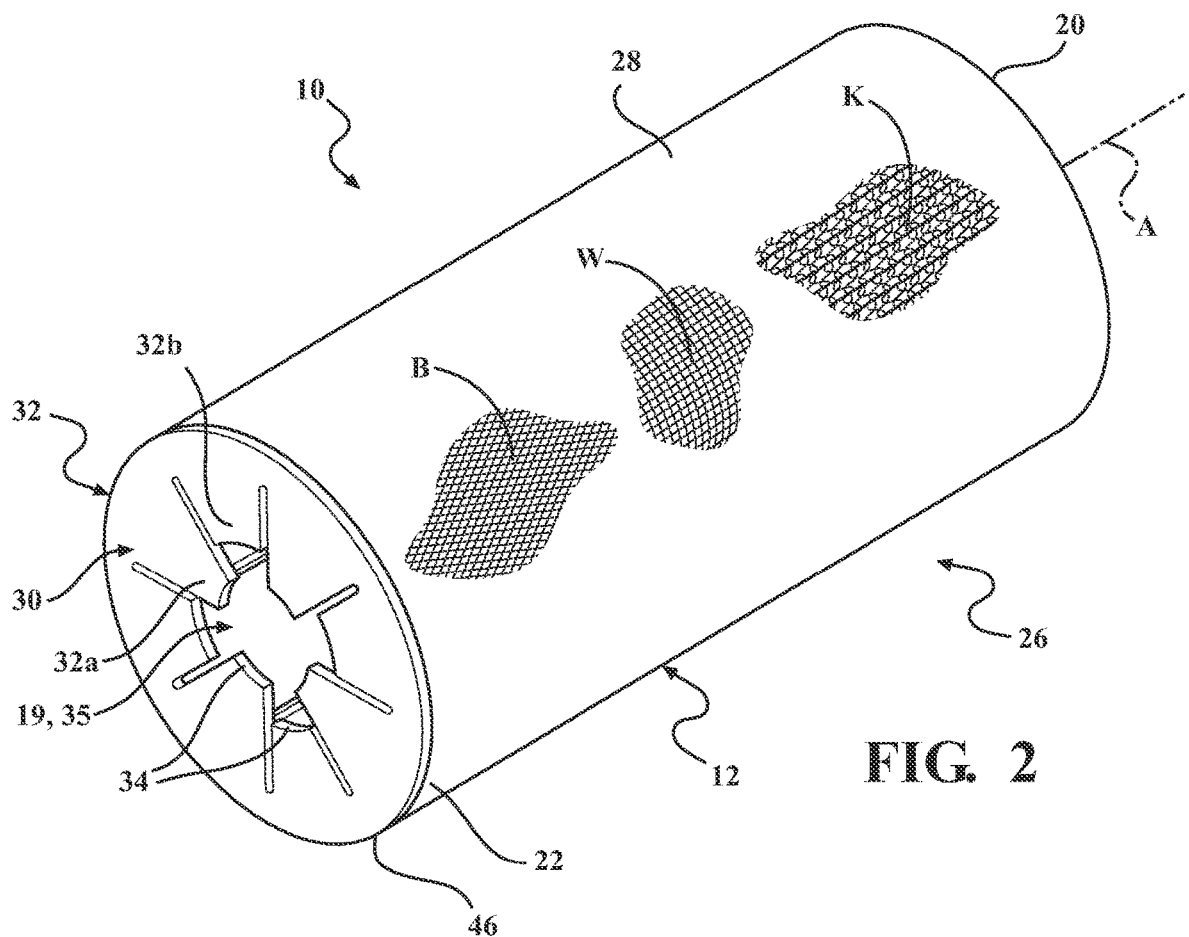
FIG. 2 is an assembled perspective view of a protective sleeve assembly according to one presently preferred embodiment of the invention.
Figure 3:
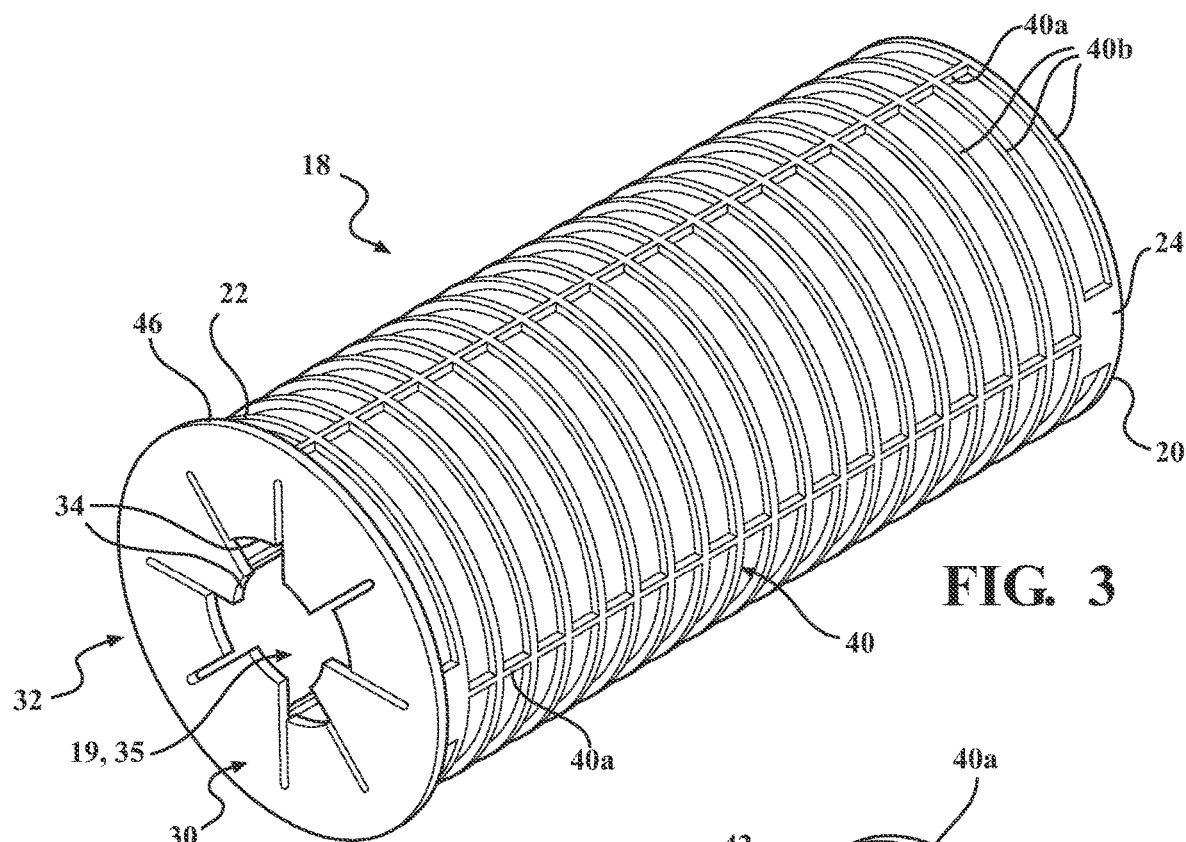
FIG. 3 is a perspective view of an inner tube and end cap of the protective sleeve assembly of FIG. 2.
Figure 4:
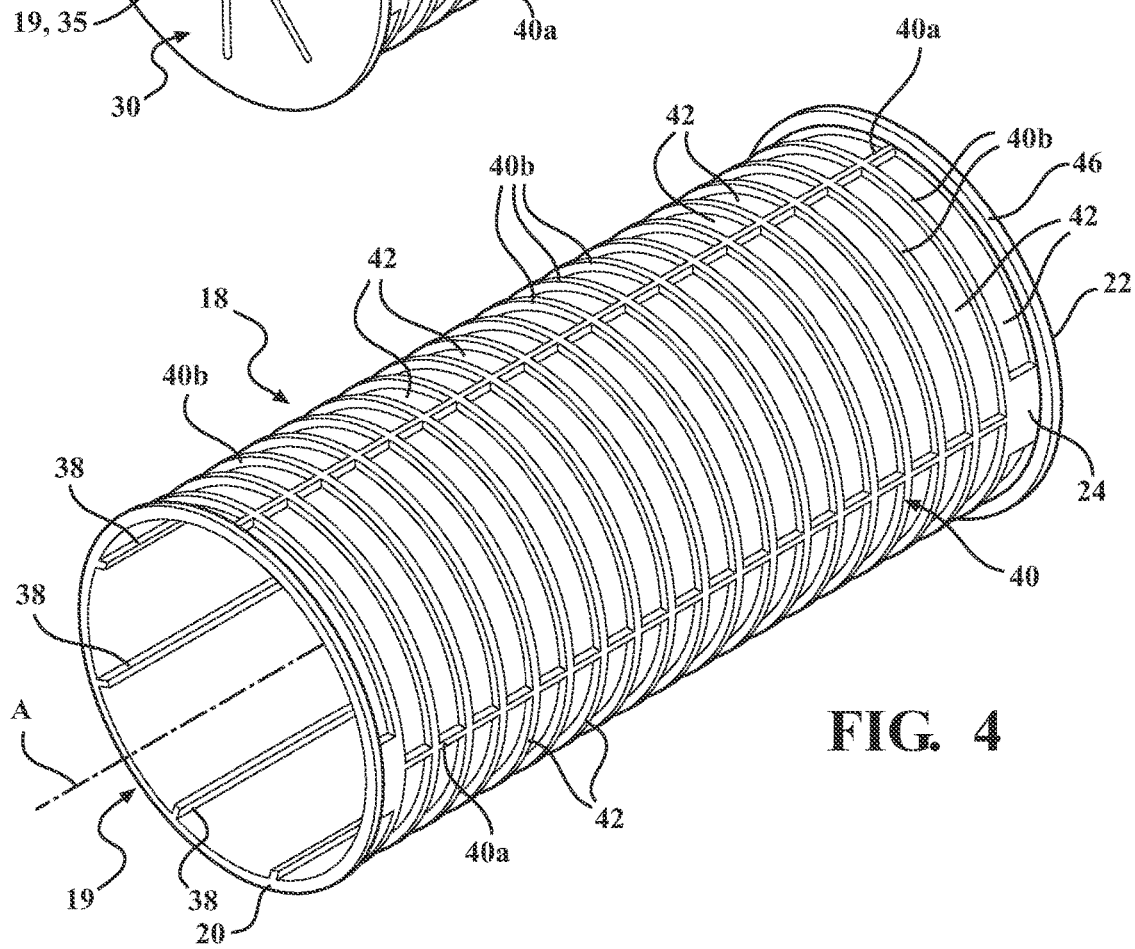
FIG. 4 is a view similar to FIG. 3 looking toward an opposite end.

Referring in more detail to the drawings, FIG. 1 shows a schematic side view of a protective sleeve assembly 10 according to one presently preferred construction used to position and maintain or hold, used synonymously herein, a first elongated member, represented here as an impact resistant, cut-through resistant, abrasion resistant, acoustic dampening, vibration dampening, thermal protection shield, for example, and referred to hereafter as a multi-layer tube or sleeve assembly 12, for example, over an electrical member, such as a sensor 14 and a first elongate member, referred to as wire harness 16, connected thereto, such as may be found in an engine compartment of a vehicle, by way of example and without limitation. In this example, the sleeve assembly 12 comprises an elongated tube assembly including an inner tubular shield, also referred to herein as inner tube 18 (FIGS. 3 and 4), having a central cavity, also referred to as bore 19, sized to at least partially receive the sensor 14 therein. The bore 19 extends along a central axis A from one open end 20 to an opposite open end 22 of the sleeve assembly 12. The inner tube 18 is constructed as a semi-rigid tubular inner wall 24 including energy dissipating features, discussed in more detail hereafter, that act to minimize the transmission of impact forces to the electrical members 14, 16, while also enhancing cut-through resistance and protection against contamination ingress. The sleeve assembly 12 further comprises an outer tubular shield, also referred to herein as outer tube 26 (FIG. 2). The outer tube 26 is constructed as a textile tube, also referred to as outer wall 28, disposed about the inner tube 18 to provide enhanced cut-through resistance and enhanced resistance to abrasion to the protective sleeve assembly 10. The sleeve assembly 12 further comprises an end cap 30 disposed over one of the ends 22. The end cap 30 includes at least one finger, shown as a plurality of fingers 32, extending radially inwardly generally toward the central axis A to free ends 34, wherein the free ends 34 bound an opening 35 sized for receipt of the wire harness 16 therethrough, wherein opening 35 is preferably sized for a slight interference fit of the wire harness 16 therethrough. The fingers 32 are resiliently flexible in opposite axial directions to allow assembly and disassembly of the protective sleeve assembly 10 along and about the electrical member 14, 16 being protected.

The sensor 14, for example, an oxygen sensor, is connected to a microprocessor (not shown) via the wire harness 16 through which it provides data used by the microprocessor to control engine operation and performance. Preferably, the wire harness 16 is covered by a second elongate member, such as an elongated protective harness sleeve 36, for example, that extends generally along the length of the wire harness 16. The harness sleeve 36 can be extruded, molded or otherwise fabricated from any material or fabric, such as a polymeric material, and is represented here, by way of example, as having annular corrugations C extending circumferentially about the harness sleeve 36 to provide radial stiffness and bending flexibility thereto.

In use, the harness sleeve 36 is disposed through the opening 35, preferably in a slight interference fit, and received within the bore 19 of the protective sleeve assembly 10. The protective sleeve assembly 10 is moved lengthwise along the harness sleeve 36 and positioned surrounding the sensor 14 and wire harness 16 to provide protection, for example, impact, abrasion, thermal and other shielding protection to the sensor 14 and wire harness 16. The end cap 30, also referred to as positioning device, is moved by sliding the protective sleeve assembly 10 lengthwise along the outer surface of the harness sleeve 36 by application of a sufficient axially directed force to overcome the slight interference fit between the harness sleeve 36 and the inner periphery of the opening 35, such as defined by the free ends 34 of the fingers 32, by way of example and without limitation. The positioning device 30, as a result of the slight interference fit, maintains the sleeve assembly 12 at a predetermined position along the harness sleeve 36. It is to be recognized that the positioning device 30 can be fixed to the sensor sleeve 12 at any time during the process, such that the end cap 30 can be fixed to the end 22 after positioning the sleeve assembly about the harness sleeve 36 and the sensor 14, or prior, in part, depending on how the positioning device 30 is fixed to the sleeve assembly 12, such as by utilizing fasteners, i.e. staples or rivets, adhesives and/or weld joints, for example. Accordingly, the protective sleeve assembly 10 is intended to be assembled as a unitary assembly, or as separate components, as desired for the intended application. If the fasteners or a weld joint is used, ideally the protective sleeve assembly 10 is intended to be assembled as a unitary assembly.

Figure 2A:
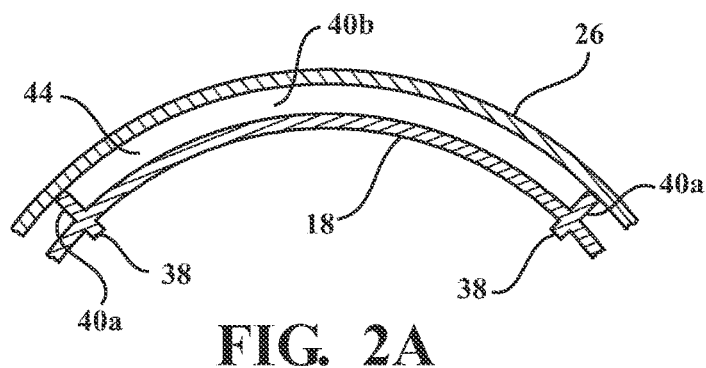
FIG. 2A is a schematic fragmentary, cross-sectional view of the protective sleeve assembly taken transversely to a central axis of the protective sleeve assembly and looking along the direction of the central axis.
Figure 2B:
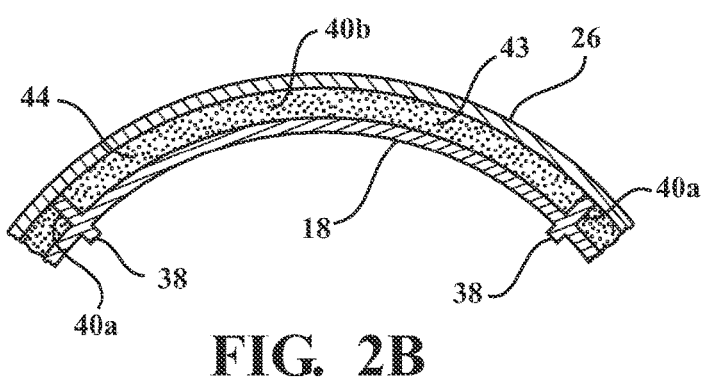
FIG. 2B is a view similar to FIG. 2A illustrating an aspect in accordance with another embodiment of the disclosure.

The inner tube 18 can be formed as a solid, impervious, semi-rigid (meaning it has significant structural integrity to maintain it's "as constructed shape in use"), tubular polymeric inner wall 24. The wall 24 of the inner tube 18 can have outer ribs 40 extending radially outwardly from the wall 24 away from the axis A to enhance strength and energy dissipation and inner ribs 38 extending radially inwardly from the wall 24 toward the axis A to enhance strength, wherein the inner ribs 38 further enhance strength and energy dissipation. The inner ribs 38 are illustrated as extending in generally parallel relation with the axis A between the opposite ends 20, 22, and can extend from one end 20 to the opposite end 22. The outer ribs 40 are shown providing lengthwise extending ribs 40a and circumferentially extending ribs 40b. The lengthwise extending ribs 40a are shown as extending in generally parallel relation with the axis A between the opposite ends 20, 22, and can extend from one end 20 to the opposite end 22, while the circumferentially extending ribs 40b extend between the lengthwise extending ribs 40a in interconnected relation with lengthwise extending ribs 40a. As such, the outer ribs 40a, 40b of the inner tube 18 form open, peripherally bounded pockets 42 facing radially outwardly, also referred to as voids, with the pockets 42 forming a plurality of encapsulated chambers 44 (FIG. 2A) between the inner tube 18 and the outer tube 26 to enhance energy dissipation, impact resistance, vibration reduction, and protection against the ingress of contamination into the central cavity 19 bounded by the protective sleeve assembly 10. As shown in FIG. 2A, the encapsulated chambers 44 can remain void of solid matter, thereby providing the encapsulated chambers filled with only air to act as individual cushions against impact forces and to enhance thermal protection to the electrical member 14, 16 extending through and within the cavity 19 of the protective sleeve assembly 10, while reducing weight of the protective sleeve assembly 10. Otherwise, as shown in FIG. 2B, in accordance with another aspect of the disclosure, the open pockets 42 can be filled with a solid material 43, including any suitable open or closed cell foam, elastomer, rubber, gel, or non-woven material, hot melt material or other type of adhesive (such as used to fix the outer tube 26 to the inner tube 18) as desired, prior to forming or disposing the outer tube 26 about the inner tube 18 to close off and encapsulate the chambers 44 to attain the enhanced cushioning and thermal protection for the intended application.

The inner tube 18 can be formed of any desired polymeric material appropriate for the intended application, including high temperature resistant and high strength polymeric materials, including thermoplastic or thermoset materials (e.g. nylon, polypropylene, polyethylene, polyvinylchloride, polyethylene terephthalate, by way of example and without limitation). The inner tube 18 can be molded via any suited molding technology for cost efficiency, though other manufacturing methods are contemplated herein, including machining operations.

The end cap 30 can be provided as a monolithic piece of material with the inner tube 18 or as a separate member that is fastened to at least one of the inner tube 18 and/or outer tube 26, and shown as being fastened to the inner tube 18. The end cap 30 can be fastened to the inner tube 18 by a fastener, such as staples, threaded fasteners, or rivets. In accordance with a further aspect of the disclosure, the fastener can be in the form of an adhesive or a weld joint, such as an ultrasonic weld joint. The end cap 30 is formed of a flexible, resilient material, such as a heat resistant polymer, including the materials noted above for the inner tube 18, for example. The fingers 32 shown in FIGS. 2 and 3, by way of example only, are wedge or generally pie shaped, with immediately adjacent fingers 32 having different lengths from one another. Every other finger 32 is shown as being the same length. Accordingly, every other finger 32a has a first length with the intermediate fingers 32b having a second length, wherein the first length is greater than the second length. Of course, it should be recognized that the fingers 32 could be provided in any suitable number and could be shaped other than generally pie shaped, such as being rectangular, curvilinear, or otherwise, depending on the application.

The end cap 30 can provide a rim 46 extending radially outwardly from the outer ribs 40. The rim 46 acts as a positive stop to the outer tube 26 to prevent the outer tube 26 from being pushed axially beyond the rim 46, such as when assembling the outer tube 26 on the inner tube 18 during manufacture, and also while in use, thus acting to maintain the outer tube 26 in its intended position about the inner tube 18.

The fingers 32 are fixed to an annular outer portion of the end cap 30 at ends opposite the free ends 34 in the manner of a cantilever spring. The cantilever action is advantageous because it allows the finger ends 34 to resiliently deflect generally along the direction of the central axis A in axially opposite directions to permit the end cap 30 to be moved axially relative to the wire harness 16 along its length in axially opposite directions. For any embodiment, the force applied to move the end cap 30 must be sufficient to overcome the resistance between the fingers 32 and any elongated component that they engage, such as the wire harness 16 or the harness sleeve 36, when provided about the wire harness 16. The resistance to deflection applied by the fingers 32 can be altered by adjusting their length, size, number and type and/or thickness of material.

Figure 5:
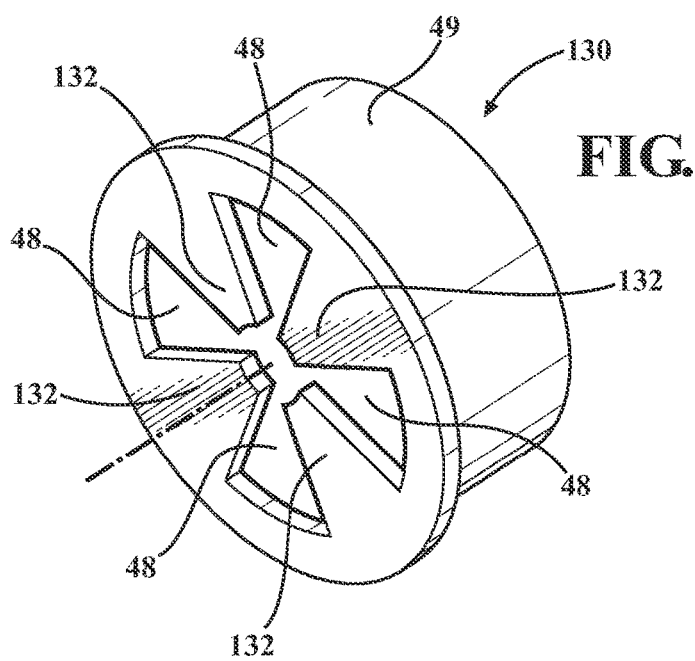
FIGS. 5-8 are perspective views of various non-limiting forms of ends caps contemplated herein.

FIG. 5 shows an alternate embodiment of an end cap 130, substantially similar to end cap 30 but, wherein the fingers 132 are positioned in spaced apart relation to one another about the circumference of the end cap 132 to define wedge shaped spaces 48 therebetween. The wedge shaped spaces 48 in the embodiment illustrated are represented as being similar in size and shape to the wedge shaped fingers 132, though they could be larger or smaller, depending on the desired performance standards for the intended application. This embodiment further illustrates a generally cylindrical portion 49 that can be sized for a close fit within or about the inner tube 18.

Figure 6:
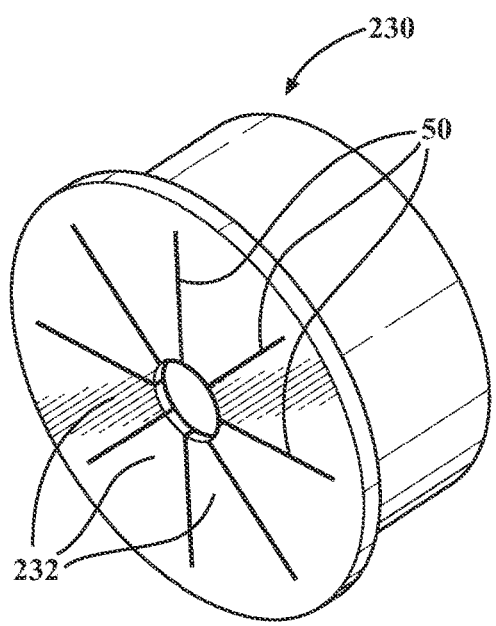

FIG. 6 shows an alternate embodiment of an end cap 230, substantially similar to end cap 30 but, wherein the fingers 232 are positioned adjacent to one another, and thus, substantially omits the spaces between the adjacent fingers 232. Instead, the adjacent fingers 232 are spaced circumferentially from one another by slits 50 having a generally uniform width along their length.

Figure 7:
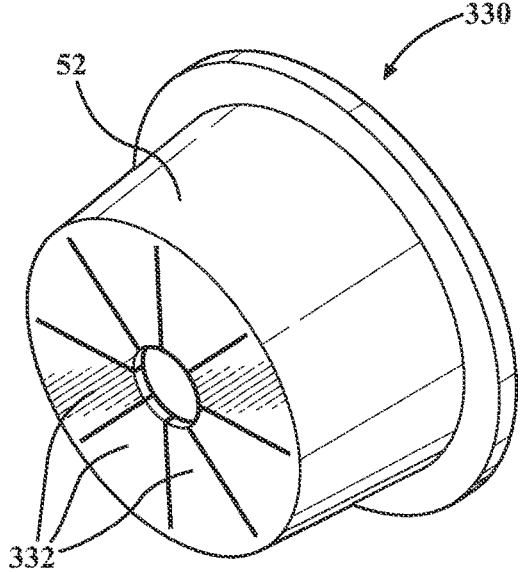

FIG. 7 shows another alternate embodiment of an end cap 330. The end cap 330 comprises an elongated, cylindrical or tapered band 52 to which are attached a plurality of fingers 332. The fingers 332 are arranged circumferentially around the band 52 adjacent to one another as in FIG. 6, though they could be in spaced apart relation as in the embodiment of FIG. 5.

Figure 8:
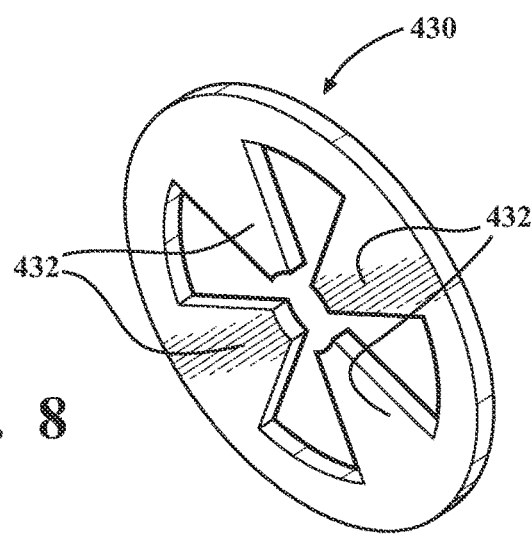

FIG. 8 illustrates another alternate embodiment of an end cap 430. The end cap 430 has fingers 432 as described for end cap 130, though it does not have a generally cylindrical portion, but rather, is formed as a flat disc. The fingers 432, although shown in spaced apart relation to one another, could be formed as shown in FIG. 6 adjacent one another. The end cap 430 is preferably fixed to the end 22 of the inner tube 18 via one of the fixation mechanisms discussed above.

The outer tube 26 can be knit (shown by way of example at K in an exemplary patch of FIG. 2, wherein it is to be understood that the entire outer tube 26 is knit), woven (shown by way of example at W in an exemplary patch of FIG. 2, wherein it is to be understood that the entire outer tube 26 is woven) or braided (shown by way of example at B in an exemplary patch of FIG. 2, wherein it is to be understood that the entire outer tube 26 is braided) of any number and type of monofilaments and/or multifilaments. The monofilaments and/or multifilaments can include wire to enhance cut-through resistance, as well as to provide protection against electromagnetic interference (EMI), radio frequency interference (RFI) and/or electrostatic discharge (ESD). The monofilaments and/or multifilaments can further include natural, organic fibers and/or inorganic fibers. The outer tube 26 can be fixed relative to the inner tube 18 via any suitable fastening mechanism, including mechanical fasteners, adhesives and or weld joint(s).

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A protective sleeve assembly for protecting an electrical member and a wire harness extending therethrough, comprising:
   a semi-rigid multi-layer tube extending longitudinally along an axis of the semi-rigid multi-layer tube between opposite ends of the semi-rigid multi-layer tube;
   an end cap disposed over one of said opposite ends, the end cap having at least one finger that extends radially inward generally toward said axis, the at least one finger being resiliently flexible in opposite axial directions to allow assembly and disassembly of the protective sleeve assembly along the wire harness and about the electrical member; and
   the semi-rigid multilayer tube including an inner tube and an outer tube, the inner tube having a semi-rigid tubular wall including radially extending energy dissipating features to minimize the transmission of impact forces to the electrical member, the outer tube being a textile tube disposed about the inner tube, the radially extending energy dissipating features including a plurality of radially outwardly extending ribs, the ribs including lengthwise extending ribs that extend generally parallel to said axis and circumferentially extending ribs extending between the lengthwise extending ribs to form a plurality of discrete pockets, wherein the discrete pockets form encapsulated chambers between the inner tube and the outer tube.

2. The protective sleeve assembly of claim 1, wherein the inner tube is a solid, impervious, polymeric wall.

3. The protective sleeve assembly of claim 1, wherein the ribs extend into abutment with the outer tube.

4. The protective sleeve assembly of claim 1, wherein the radially extending energy dissipating features include radially inwardly extending ribs.

5. The protective sleeve assembly of claim 2, wherein the end cap is a solid, semi-rigid, nonmetallic material.

6. The protective sleeve assembly of claim 2, wherein the outer tube is knit, woven or braided.

7. The protective sleeve assembly of claim 2, wherein the radially extending energy dissipating features include radially inwardly extending ribs.

8. The protective sleeve assembly of claim 7, wherein the radially inwardly extending ribs extend generally parallel to said axis.

9. A protective sleeve assembly for protecting an electrical member and a wire harness extending therethrough, comprising:
   a semi-rigid, multi-layer tube extending longitudinally along an axis of the semi-rigid multi-layer tube between opposite ends of the semi-rigid multi-layer tube;
   an end cap disposed over one of said opposite ends, the end cap having an opening for receipt of the wire harness therethrough to allow assembly and disassembly of the protective sleeve assembly along the wire harness and about the electrical member; and
   the semi-rigid multilayer tube including an inner tube and a textile outer tube, the inner tube being a solid, impervious, polymeric wall including a plurality of radially outwardly extending ribs extending into abutment with the outer tube to form a plurality of encapsulated chambers between the inner tube and the outer tube, the plurality of radially outwardly extending ribs including lengthwise extending ribs that extend generally parallel to said axis and circumferentially extending ribs extending between the lengthwise extending ribs to form a plurality of discrete pockets, wherein the discrete pockets form the encapsulated chambers between the inner tube and the outer tube.

10. The protective sleeve assembly of claim 9, wherein the inner tube has a plurality of radially inwardly extending ribs.

11. A method of constructing a protective sleeve assembly for protecting an elongate member extending therethrough, comprising:
   forming a semi-rigid multi-layer tube extending longitudinally along an axis of the semi-rigid multi-layer tube between opposite ends of the semi-rigid multi-layer tube;

providing an end cap having at least one finger that extends radially inward generally toward the axis disposed over one of the ends, with the at least one finger being resiliently flexible in opposite axial directions;

constructing the semi-rigid, multilayer tube including an inner tube and an outer tube, and constructing the inner tube having a semi-rigid tubular polymeric, impervious wall including radially outwardly extending ribs;

constructing the outer tube as a textile tube disposed about the inner tube; and constructing the radially outwardly ribs including lengthwise extending ribs that extend generally parallel to the axis and including circumferentially extending ribs that extend between the lengthwise extending ribs to form a plurality of discrete pockets to bound discrete encapsulated chambers between the inner tube and the outer tube.

12. The method of claim 11, further including leaving the discrete encapsulated chambers void of solid matter, thereby providing the encapsulated chambers filled with only air.

13. The method of claim 11, further including providing the encapsulated chambers being filled with a solid material.

14. The method of claim 11, further including forming the inner tube having radially inwardly extending ribs.

15. The method of claim 14, further including forming the radially inwardly extending ribs extending generally parallel to the axis.

* * * * *